US012417117B2

(12) United States Patent
Morgan et al.

(10) Patent No.: US 12,417,117 B2
(45) Date of Patent: Sep. 16, 2025

(54) AUTOMATIC DETERMINATION OF APPLICATION STATE IN A MULTI-USER ENVIRONMENT

(71) Applicant: Apple Inc., Cupertino, CA (US)

(72) Inventors: Tucker B. Morgan, Sunnyvale, CA (US); Luis R. Deliz Centeno, Fremont, CA (US)

(73) Assignee: Apple Inc., Cupertino, CA (US)

( * ) Notice: Subject to any disclaimer, the term of this patent is extended or adjusted under 35 U.S.C. 154(b) by 472 days.

(21) Appl. No.: 18/061,199

(22) Filed: Dec. 2, 2022

(65) Prior Publication Data

US 2023/0315509 A1 Oct. 5, 2023

Related U.S. Application Data

(63) Continuation of application No. 17/998,422, filed as application No. PCT/US2021/029398 on Apr. 27, 2021, now abandoned.

(60) Provisional application No. 63/022,967, filed on May 11, 2020.

(51) Int. Cl.
G06F 9/46 (2006.01)
G06F 9/54 (2006.01)
H04L 65/401 (2022.01)

(52) U.S. Cl.
CPC .............. G06F 9/461 (2013.01); G06F 9/542 (2013.01); H04L 65/4015 (2013.01)

(58) Field of Classification Search
None
See application file for complete search history.

(56) References Cited

U.S. PATENT DOCUMENTS

| 10,304,252 | B2 | 5/2019 | Tadros | |
|---|---|---|---|---|
| 2005/0071760 | A1* | 3/2005 | Jaeger | G06F 9/453 715/705 |
| 2011/0265099 | A1* | 10/2011 | Tobe | G06F 9/542 719/314 |
| 2013/0218315 | A1* | 8/2013 | Jaeger | G06F 3/16 700/94 |
| 2014/0366038 | A1 | 12/2014 | Mckeown | |
| 2018/0061132 | A1 | 3/2018 | Lanier | |
| 2018/0121054 | A1 | 5/2018 | Van Wie | |

(Continued)

OTHER PUBLICATIONS

Feick, et al., "Mixed-Reality for Object-Focused Remote Collaboration," UIST '18 Adjunct, Oct. 14-17, 2018.

(Continued)

Primary Examiner — Craig C Dorais
(74) Attorney, Agent, or Firm — Blank Rome LLP

(57) ABSTRACT

A state of a multi-user communication session is saved in response to detection of an application state saving event, or a session state saving event. During runtime, application state saving events may be detected for each application executing during a session. Application state parameters are saved in response to each application state saving event, from which the application may be launched to the saved state. In response to a state saving event, the most recent application state information for each application executing in the session are collected and stored such that the multi-user communication session may be launched to the saved state, including each application executing in the session.

20 Claims, 7 Drawing Sheets

(56) References Cited

U.S. PATENT DOCUMENTS

2018/0359448 A1 12/2018 Harries
2019/0310757 A1 10/2019 Lee

OTHER PUBLICATIONS

Teo, et al., "Investigating the use of Different Visual Cues to Improve Social Presence within a 360 Mixed Reality Remote Collaboration," The 17th International Conference on Virtual-Reality Continuum and its Applications in Industry, Nov. 2019.

* cited by examiner

AUTOMATIC DETERMINATION OF APPLICATION STATE IN A MULTI-USER ENVIRONMENT

BACKGROUND

This disclosure relates generally to image processing. More particularly, but not by way of limitation, this disclosure relates to techniques and systems for automatically determining application state in a multi-user communication session.

Some devices are capable of generating and presenting extended reality (XR) environments. An XR environment may include a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. Some XR environments allow multiple users to interact with each other within the EX environment. However, when an XR environment is initiated, what is needed is an improved technique for determining a saved state of an application or a session.

DETAILED DESCRIPTION

Figure 1:
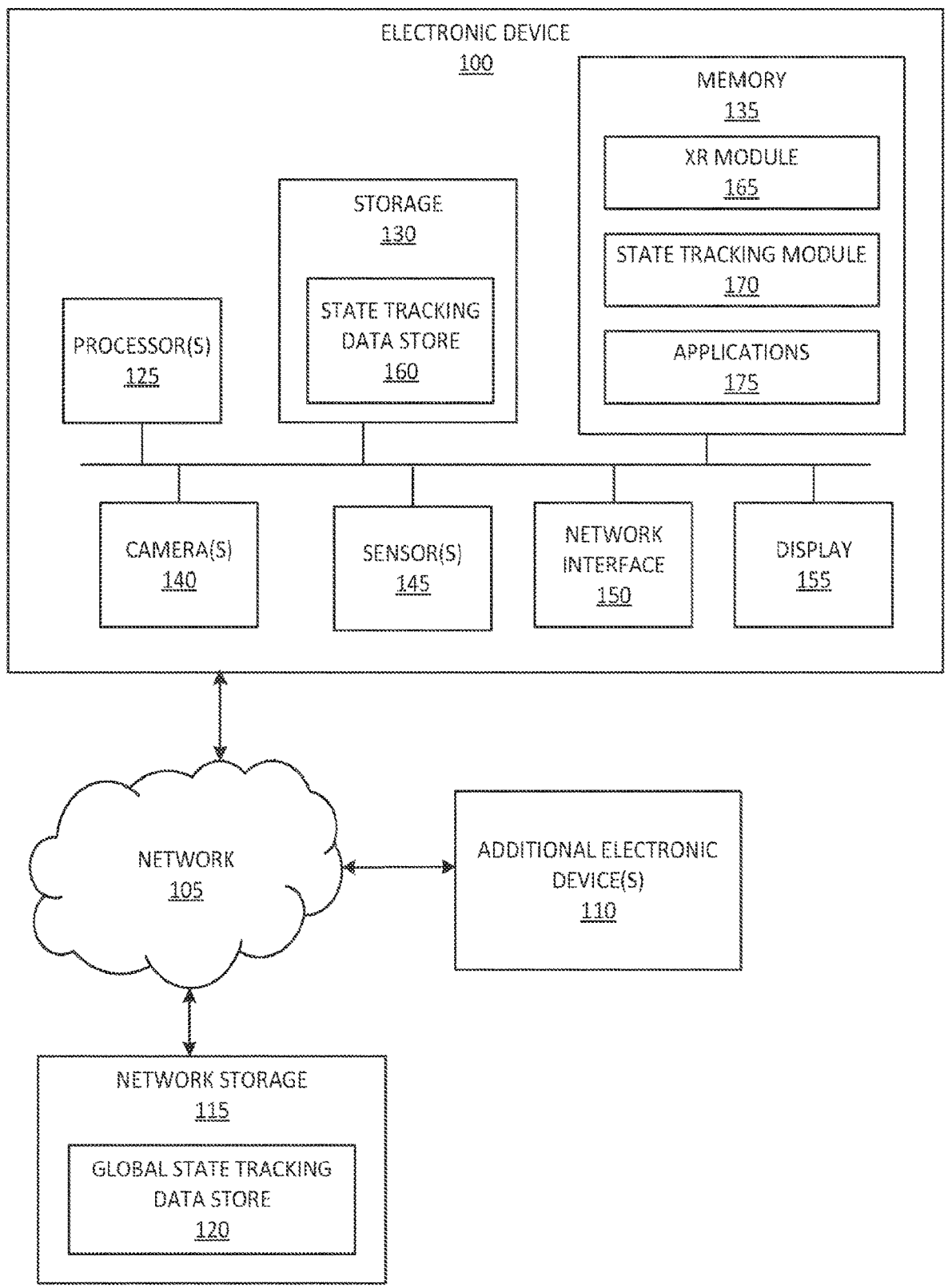
FIG. 1 shows, in block diagram form, exemplary systems for use in various extended reality technologies according to one or more embodiments.

This disclosure pertains to systems, methods, and computer readable media to save state information for a multi-user communication session in which multiple user devices are active in a single session. According to one or more embodiments, state information for applications running in a multi-user communication session may be stored from time to time. A session may include multiple applications which may be utilized by the participants. The applications executing within the multi-user communication session may save application state information from time to time, which may be utilized by a device to re-launch the particular application to the saved state. Session state information may be collected stored based on a latest saved state information for each of the applications executing within the multi-user communication session, as well as additional session state information.

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

For purposes of this disclosure, a multi-user communication session can include a communication session in which two or more devices are participating in an XR environment.

For purposes of this disclosure, a local multi-user communication device refers to a current device being described, or being controlled by a user being described, in a multi-user communication session.

For purposes of this disclosure, colocated multi-user communication devices refer to two devices that share a physical environment and an XR environment, such that the users of the colocated devices may experience the same physical objects and ER objects.

For purposes of this disclosure, a remote multi-user communication device refers to a secondary device that is located in a separate physical environment from a current, local multi-user communication device. In one or more embodiments, the remote multi-user communication device may be a participant in the multi-user communication session.

For purposes of this disclosure, shared virtual elements refer to XR objects that are visible or otherwise able to be experienced by participants in a common XR session.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics modeling systems having the benefit of this disclosure.

Referring to FIG. 1, a simplified block diagram of an electronic device 100 is depicted, communicably connected to additional electronic devices 110 and a network storage 115 over a network 105, in accordance with one or more embodiments of the disclosure. Electronic device 100 may be part of a multifunctional device, such as a mobile phone, tablet computer, personal digital assistant, portable music/video player, wearable device, head-mounted systems, projection-based systems, base station, laptop computer, desktop computer, network device, or any other electronic systems such as those described herein. Electronic device 100, additional electronic device 110, and/or network storage 115 may additionally, or alternatively, include one or more additional devices within which the various functionality may be contained, or across which the various functionality may be distributed, such as server devices, base stations, accessory devices, and the like. Illustrative networks, such as network 105 include, but are not limited to, a local network such as a universal serial bus (USB)network, an organization's local area network, and a wide area network such as the Internet. According to one or more embodiments, electronic device 100 is utilized to participate in a multi-user communication session in an XR environment. It should be understood that the various components and functionality within electronic device 100, additional electronic device 110 and network storage 115 may be differently distributed across the devices, or may be distributed across additional devices.

Electronic Device 100 may include one or more processors 125, such as a central processing unit (CPU). Processor(s) 125 may include a system-on-chip such as those found in mobile devices and include one or more dedicated graphics processing units (GPUs). Further, processor(s) 125 may include multiple processors of the same or different type. Electronic device 100 may also include a memory 135. Memory 135 may include one or more different types of memory, which may be used for performing device functions in conjunction with processor(s) 125. For example, memory 135 may include cache, ROM, RAM, or any kind of transitory or non-transitory computer readable storage medium capable of storing computer readable code. Memory 135 may store various programming modules for execution by processor(s) 125, including XR module 165, state tracking module 170, and other various applications 175. Electronic device 100 may also include storage 130. Storage 130 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Storage 130 may be configured to store state tracking data 160, according to one or more embodiments. Electronic device may additionally include network interface 150, from which additional network components may be accessed via network 105.

Electronic device 100 may also include one or more cameras 141) or other sensors 145, such as depth sensor, from which depth or other characteristic of an environment may be determined. In one or more embodiments, each of the one or more cameras 140 may be a traditional RGB camera, or a depth camera. Further, cameras 140 may include a stereo- or other multi-camera system, a time-of-flight camera system, or the like. Electronic device 100 may also include a display 155. The display device 155 may utilize digital light projection, OLEDs, LEDs, uLEDs, liquid crystal on silicon, laser scanning light source, or any combination of these technologies. Display device 155 may be utilized to present a representation of a multi-user communication session, including shared virtual elements within the multi-user communication session and other ER objects.

Storage 130 may be utilized to store various data and structures which may be utilized for providing state information in order to track an application and session state. Storage 130 may include, for example, state tracking data store 160. State tracking data store may be utilized to store state information for applications, such as applications 175, and/or multi-user communication sessions, in which multiple applications may execute. In accordance with one or more embodiments, the state tracking data store 160 may store state information from which an application and/or session may resume upon initialization.

According to one or more embodiments, memory 135 may include one or more modules that comprise computer readable code executable by the processor(s) 125 to perform functions. The memory may include, for example an XR module 165 which may be used to provide a multi-user communication session in an XR environment. The multi-user communication session XR environment may be a computing environment which supports a shared experience by electronic device 100 as well as additional electronic devices 110 within a multiuser communication session. In one or more embodiments, application state data may be stored occasionally, periodically, or in response to a trigger, such as an application state saving event, or a request from another module or device. In one or more embodiments, session state information may also be stored in state tracking data store 160. In one or more embodiments, session state information may include data required to boot an XR environment to a particular state. In one or more embodiments, the session state information may include application state information for all applications running at the time the state is stored. Additionally, or alternatively, the session state information may include a reference to application state information which should be obtained in order to reboot the multi-user communication session to a particular state. In one or more embodiments, the state information may be stored locally at each system, such as electronic device 100 and additional electronic devices 110, and/or the state information may be stored in global state tracking data store 120 as part of network storage 115.

The state tracking module 170 may detect when state should be captured on a periodic basis, based on user input, or based on automatic trigger, such as by detecting an application state saving event or a session state saving event, as will be described in greater detail below. Applications 175 may include, for example, computer applications that may be experienced in an XR environment by multiple devices, such as electronic device 100 and additional electronic devices 110. In one or more embodiments, the applications 175 may respond to a request for state information from state tracking module 170 by providing state information which will allow each application to boot to a particular state.

State tracking data store 160 may include various types of state information. For example, state tracking data store 160 may include application state information for the various applications 175, which may be captured by the state tracking module 170 in response to an application state saving event. The application state information may include information from which a device can re-launch the application to a given state. State tracking data store 160 may also store session state information. Session state information may include an aggregate of application state information that is pre-stored or that is obtained at the time of a session state saving event for a particular multi-user communication session. In one or more embodiments, the session state information may be stored in association with session parameters, which may provide context as to what state the state information refers. As an example, session parameters may include day, time, identity or other information regarding active users or devices in the application or session, physical location of one or more of the users or devices during the session, security parameters, and the like. Session state information may include additional information, such as a particular configuration of applications, user preferences, and the like.

According to one or more embodiments, data stored as state information may be utilized to determine how one or more applications or sessions are re-launched. As an example, geometric information or other characteristics about one or more physical environments in which virtual objects are presented within an application may be stored to determine how the virtual objects should be presented upon re-launch. As an example, state information may include information regarding physical objects or surfaces with which virtual objects are interfacing. As an example, a virtual object displayed to appear to be sitting on a physical table may require state information that includes information regarding the table, such as a plane, dimensions of the table, location of the table in the environment, and the like. Accordingly, a state tracking module 170 may determine where to place the virtual object upon re-launch. In one or more embodiments, if upon relaunch, the physical surface or object has moved, or if the device is determined to be in a different physical environment, then an alternative physical surface may be found, or a virtual surface may be generated and presented to replace the original surface.

Although electronic device 100 is depicted as comprising the numerous components described above, in one or more embodiments, the various components may be distributed across multiple devices. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 2:
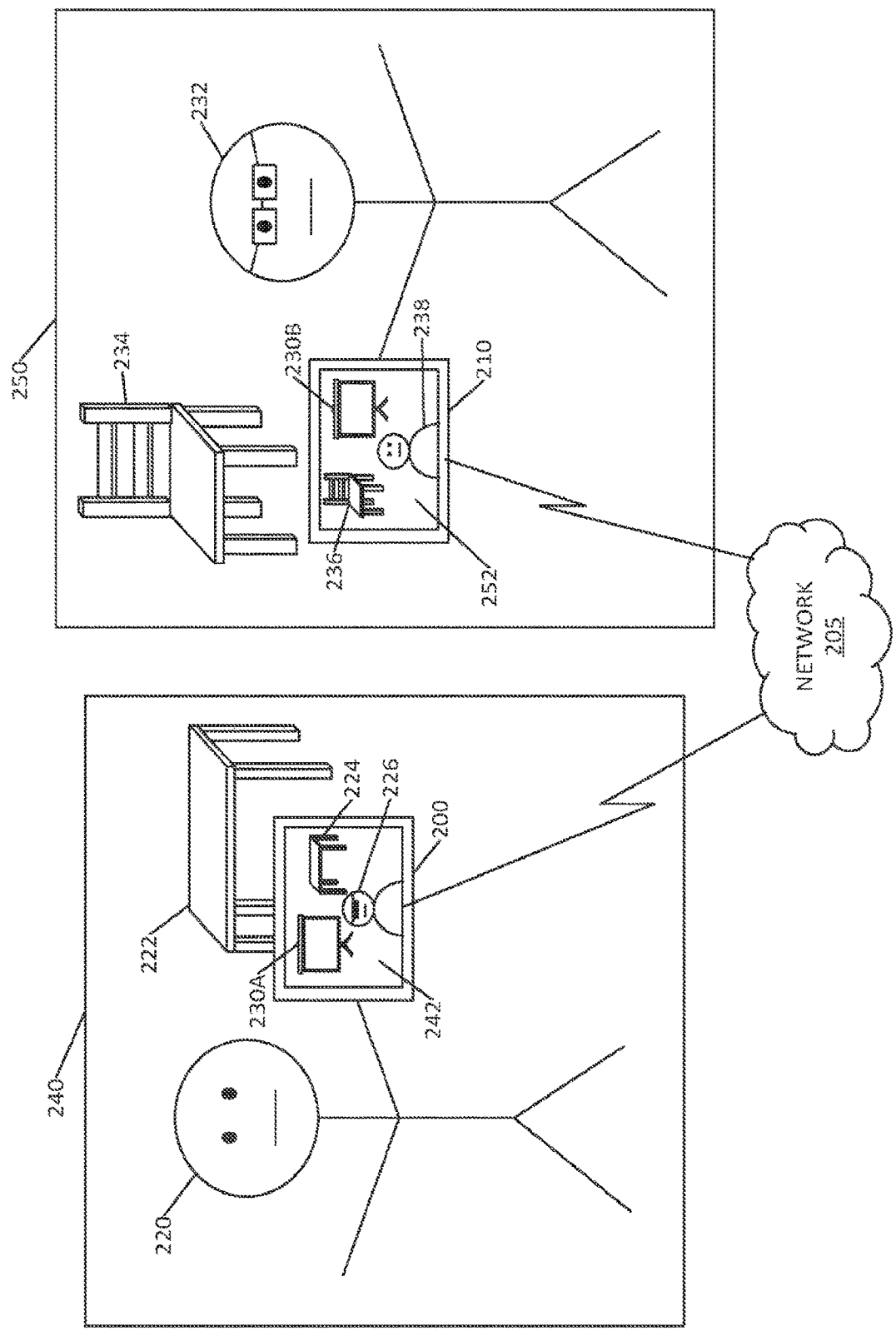
FIG. 2 shows a diagram of example operating environments, according to one or more embodiments.

FIG. 2 shows a diagram of example operating environments, according to one or more embodiments. While pertinent features are shown, those of ordinary skill in the art will appreciate from the present disclosure that various other features have not been illustrated for the sake of brevity and so as not to obscure more pertinent aspects of the example among implementations disclosed herein. To that end, as a nonlimiting example, the operating environment 240 includes a first physical environment, whereas operating environment 250 includes a second physical environment.

As shown in FIG. 2, the first environment 240 includes a first user 220 that is utilizing a first electronic device 200, and the second environment 250 includes a second user 232 that is utilizing a second electronic device 210. In one or more embodiments, the first electronic device 200 and the second electronic device 210 include mobile devices, such as handheld devices, wearable devices, and the like.

In one or more embodiments the first electronic device 200 and the second electronic device 210 communicate with each other via a network 205. Examples of network 205 may include, for example, the Internet, a wide area network (WAN), a local area network (LAN), etc. In one or more embodiments, the first electronic device 200 and the second electronic device 210 may be participating in a common multi-user communication session in an ER environment.

Although electronic device 200 and electronic device 210 may be participating in a common multi-user communication session, the XR environment may be presented differently on each device. As shown, the electronic device 200 may depict physical objects of the environment 240. As shown, physical table 222 may be depicted on the display 242 as a virtual table 224. In one or more embodiments, the display 242 may be a see-through display, and virtual table 224 may simply be a view of physical table 222 through display 242. As another example, the table or other surfaces may be presented in the form of a virtual surface, such as a plane. Dimensions of the physical object may be detected and saved, for example, as state information, without storing details about the specific table. In one or more embodiments, a privacy protecting abstraction layer may be applied by obtaining and storing limited information about real objects in a real environment.

Display 242 of electronic device 200 may also include an avatar 226 corresponding to user 232. For purposes of this disclosure, and avatar may include a virtual representation of a user. The avatar may depict real-time actions of the corresponding user 232, including movement, updated location, and/or interactions with various physical components and/or virtual components within the multi-user communication session XR environment. An avatar may or may not mimic physical characteristics of the user, and may or ma not mimic facial expressions of the user.

According to one or more embodiments, a multi-user communication session may support one or more multi-user communication applications or other modules which allow for depictions of shared virtual objects across all participating devices within a multi-user communication session, such as electronic device 200 and electronic device 210. As shown in display 242, presentation panel 230A is an example of a shared virtual object which may be visible to all participating devices.

As an example, returning to environment 250, electronic device 210 includes a display 252, on which the presentation panel virtual object 230B is depicted. It should be understood that in one or more embodiments, although the same XR object may be visible across all participating devices, the XR object may be rendered differently according to the location of the electronic device, the orientation of the electronic device, or other physical or virtual characteristics associated with electronic devices 200 and 210 and/or the multi-user communication session for which a representation is presented within displays 242 and 252.

Returning to environment 250, physical chair 234 is depicted as virtual chair 236. As described above, and one or more embodiments, display 252 may be a see-through display, and virtual chair 236 may be a view of physical chair 234 through the see-through display 252. In addition, electronic device 210 depicts an avatar 238 corresponding to user 220. Another characteristic of a multi-user communication session XR environment is that while virtual objects may be shared across participating devices, physical worlds may appear different. For instance, the XR environment depicted in display 242 includes presentation panel 230A that also appears in the XR environment depicted in display 252. However, the XR environment depicted in display 242 includes virtual table 224 which is a representation of physical table 222, which is not included in the XR environment depicted in display 252. Similarly, the XR environment depicted in display 252 includes representation 236 of physical chair 234, which is not included in the XR environment depicted in display 242.

According to one or more embodiments, the shared virtual objects, such as presentation panel 230, may be rendered as part of an application. In one or more embodiments, multiple applications may be executed within the multi-user communication session XR environment depicted in 242 and 252.

Figure 3:
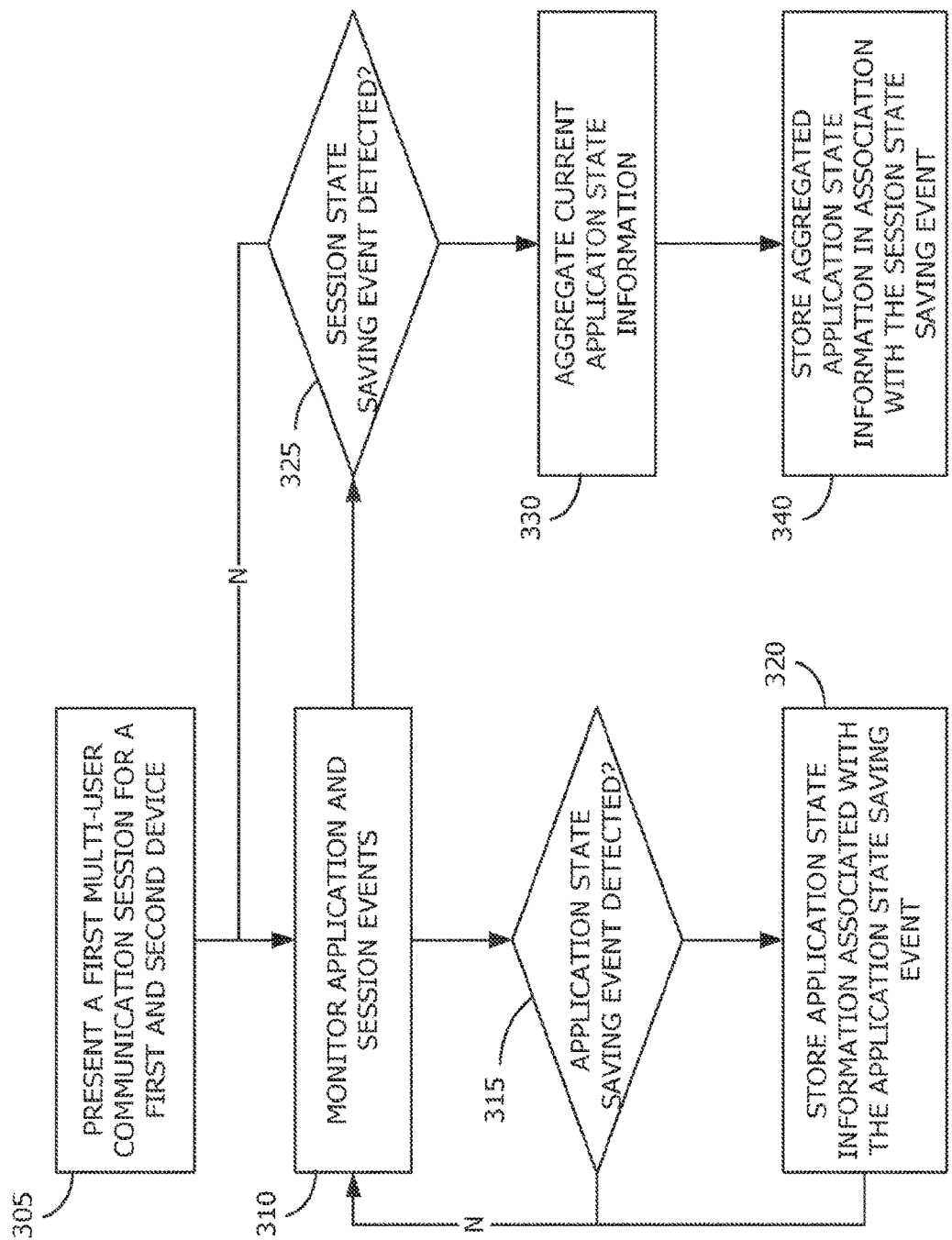
FIG. 3 shows a flowchart of a method for collecting session state data, according to one or more embodiments.

FIG. 3 shows a flowchart of a method for saving application and session state, according to one or more embodiments. For purposes of explanation, the flowchart is described utilizing example components from FIG. 1. Although the flowchart shows various procedures performed by particular components in a particular order, it should be understood that according to one or more embodiments, the various processes may be performed by alternative devices or modules. In addition, the various processes may be performed in an alternative order, and various combinations of the processes may be performed simultaneously. Further, according to some embodiments, one or more of the processes may be omitted, or others may be added.

The flowchart begins at 305 where the XR module 165 presents a representation of a first multi-user communication session for a first device in the multiuser communication session with a second device. In one or more embodiments, presenting the representation of the multi-user communication session may include presenting an XR environment that includes avatar representations of active users, a set of shared virtual objects that are visible to one or more devices active within the session, or the like.

The flowchart continues at block 310, where the state tracking module 170 monitors application and session events. According to some embodiments, the communication session may include the execution of one or more applications. Each application may be associated with particular state saving events, which may be application-specific, session-specific, or the like, according to one or more embodiments. An application state saving event may include a particular event or combination of characteristics that trigger state information to be stored such that the application can be relaunched to a state consistent with the stored state. As such, an application state saving event may include events specific to the application, such as reaching a particular point of execution in the application, a predetermined periodic trigger at which point state information should be stored, an identification of a particular configuration of the application, or the like. Further, in one or more embodiments, the application state saving event may be associated with external parameters which may comprise the application state saving event. As an example, the application state saving event may include a particular physical location in which a device is located during execution of the application, a combination of active users utilizing an application in a multiuser communication session, an indication of one or more additional applications executing within the multiuser communication session concurrently with the application, and the like.

The flowchart continues at 315, where a determination is made as to whether an application state saving event is detected. If an application state saving event is detected, then the flowchart continues to block 320, where the state tracking module 170 stores application information associated with the application state saving event. The application stat information may include data which, when provided to the application, allow the application to relaunch to the saved state. In one or more embodiments, the application state information may also be associated with an identifier that may be utilized to reference the state information later. Application state information may include, for example, geometric information regarding a physical environment in which the multi-user communication session is running, such as surfaces or other portions of the physical environment which affect the display of the placement of virtual objects. State information may include other data, such as users that are participating in the application and/or in the session, menus that are opened or closed, a time and/or date when the application was opened or closed, and the like.

According to one or more embodiments, the application state information may be stored in association with the application state saving event that caused the application state information to be obtained. According to one or more embodiments, the stored application state information may be reference with a particular application state saving event in accordance with the association. Once the state information is stored, the flowchart continues at block 310, where the state tracking module 170 continues to monitor application and session events.

Returning to 310, the flowchart also continues at 325, where determination is made regarding whether session state saving events are detected. According to one or more embodiments, session state saving events may be specific to a particular multiuser communication session. As an example, a session state saving event may include a change in a combination of users or devices that are active within the session, a change in a physical location of one or more of the users or devices active within the session, termination of the multi-user communication session, and the like. As another example, the session state saving event may be intrinsic to the session. For example, a particular multiuser communication session may be associated with a predetermined time period after which state information should be stored. As another example, a change in combination of applications executing within the session may indicate a session state saving event. The flowchart returns to block 310 and the session is monitored until a determination is made at block 325 that a session state saving event is detected.

If the session state saving event is detected at 325, then the flowchart continues to block 330. At block 330, the state tracking module 170 aggregates current application state parameters to generate session state data. In one or more embodiments, the current application state information may be obtained from the most recently stored application state data at block 320 for each application executing in the multiuser communication session. In one or more embodiments, the state tracking module 170 may request application state information from each application executing in a multiuser communication session in response to the session state saving event at block 325.

The flowchart concludes at 340, where the state tracking module 170 stores the aggregated application state information in association with the session state saving event. In one or more embodiments, the session state information may include the aggregated application state information from which the application state information may be obtained.

Figure 4:
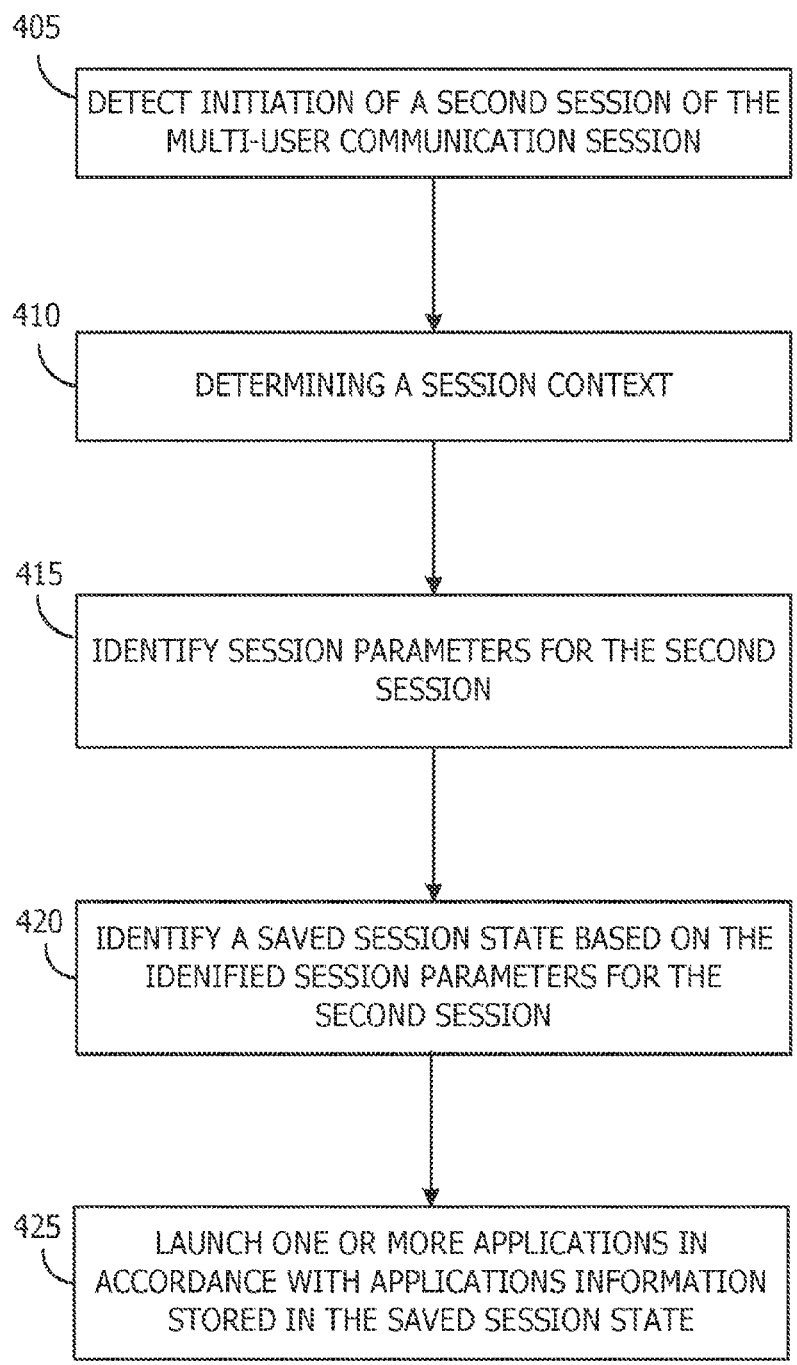
FIG. 4 shows a flowchart for initiating a multi-user communication session in accordance with saved state information, according to one or more embodiments.

FIG. 4 depicts a flowchart of a technique for launching a multi-user communication session into a particular state. For purposes of clarity, the description of the various processes will be described in relation to the components described in FIG. 1.

The flowchart begins at 405, where the state tracking module 170 detects initiation of a second session of the multi-user communication XR environment for a multiuser communication session. According to one or more embodiments, the initiation of the second session may be detected in response to the electronic device 100 booting up, electronic device 100 initiating the XR module 165, as well as changes to a context of an ongoing multi-user communication session which effectively changes the state parameters. As an example, if an initiation of a second session may be detected a combination of the users active in the multi-user communication session changes, a physical location changes in which the XR environment is presented, a combination of applications that are active within the multi-user communication session, and the like.

The flowchart continues at 410, where the state tracking module 170 determines a session context. In one or more embodiments, the session context may include various characteristics of the multi-user communication session, or the computational environment or physical environment in which the multi-user communication session is presented. In addition, in one or more embodiments, the session context may also include such contextual information as time of day, day of the week, active applications, and the like. In one or more embodiments, the system context may also be determined in accordance with other data provided by electronic device 100, such as a calendar entry, and the like.

At block 415, the state tracking module 170 identifies session parameters for the second session in accordance with the determined session context. As described above, the session parameters may include identifying information for the session from which a determination may be made as to which state the session should be launched.

The flowchart continues at block 420, where the state tracking module 170 identifies a saved session state based on the identified session parameters for the second session. As described above, state information may be stored in state tracking data store 160, global state tracking data store 120, or the like. In one or more embodiments, state information for a session may be stored in accordance with session parameters which characterize the session. As such, the identified session parameters for the second session may be utilized to identify an appropriate state to which the session should be launched. Accordingly, the state information for the identified saved session state may be obtained from the state tracking data store 160 or the global state tracking data store 120 in accordance with the identified session parameters. Session state information may additionally include information related to the presentation of the various applications and other shared virtual objects within the multi-user communication session. As an example, session state information may include relational information as to how applications are presented, locations of avatars, and the like.

The flowchart concludes at block 425, where the state tracking module 170 launches one or more applications in accordance with state information stored within the saved session state data. As described above, during a prior session, one or more applications may be running. According to embodiments, each application may occasionally or periodically store application state information in accordance with application-specific state saving events, session specific state saving triggers, or the like. In one or more embodiments, the same session state may identify applications which should be booted to reach the identified session state, and the session state data may include application state information for each of the applications that are to be launched as part of the saved session state. Further, the applications that are to be launched may additionally be identified with a state to which the applications should be launched. Accordingly, the electronic device may utilize the state information to launch one or more applications 175 to a particular state. In one or more embodiments, electronic device 100 may also utilize XR module 165 to ensure consistent presentation of virtual objects within the multi-user communication session.

In one or more embodiments, the device may utilize the state information to perform a hierarchical technique to re-launch an application and/or a session. As an example, the state information may indicate physical parameters, such as physical surfaces or other characteristics which affect the presentation of the virtual objects of the application and/or session. For example, the state information may indicate where a virtual object has been placed. As another example, if the shape or geometry of the virtual object is unknown or inconsistent, then the geometry of the physical environment may also be saved and used as state information. State information may also include developer-defined information or application-specific information which may be useful for re-launching the application in a consistent or different physical environment.

As an example, a chess application may include as state information data regarding a physical location and a physical surface on which the chess board is placed, as well as a state of the game (e.g., positions, turns, etc.). When the chess application is re-launched, a determination may be made regarding whether a current location is the same as the stored location in the state information. If so, then a determination may be made regarding whether the original surface on which the virtual chessboard was placed is still available in the physical environment. If so, then the chess application may be re-launched to be presented in a consistent manner as the instance represented by the state information. If the original surface is no longer available, an alternative surface may be identified which may accommodate the size of the original surface and the like. If an alternative surface is unavailable, then a virtual surface may be generated and utilized to place the chess board. Similarly, if it is determined that the device is in a different physical environment than the physical environment represented by the state information, then a new physical surface may be identified, or a virtual surface may be generated and utilized to place the chess board.

Figure 5:
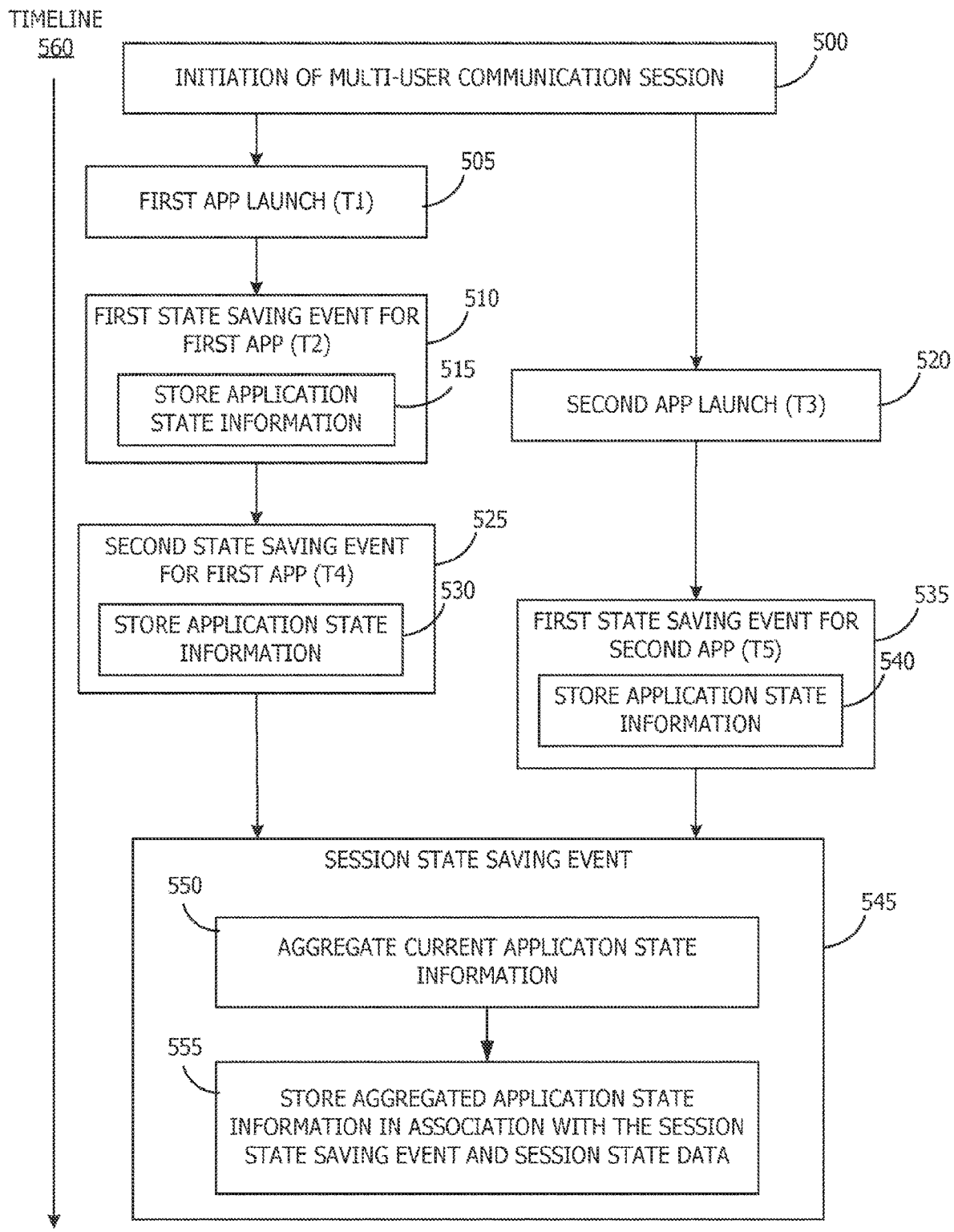
FIG. 5 shows an example timing diagram of a technique for saving state information for a session state saving event, in accordance with one or more embodiments.

FIG. 5 depicts an example timing diagram for saving application state information and session state information, according to one or more embodiments. The various components and processes will be described in relation to the components of FIG. 1. However, it should be understood that the various processes may be formed performed by alternative components, and the identified components may be replaced by alternative components.

The timing diagram presents a timeline 560 over which various events occur within a multi-user communication session. The flow diagram begins at 500 where the multi-user communication session is initiated. The multi-user communication session may be initiated, for example when a device enters a shared XR environment with one or more other devices. As described above, within the XR session, various applications may be launched which may be synchronized and utilized by the various devices active in the multi-user communication session. In one or more embodiments, and in a particular multi-user communication session may be initiated when the characteristics of the particular session are modified in a meaningful manner. As an example, if the parameters that define a particular session or changed, then a new multi-user communication session may be determined to be initiated. For example, a multi-user communication session may be determined to be initiated. When a particular combination of devices or users are active in the session, if a physical environment in which the session is occurring changes, if a particular combination of applications executing in the session changes, and the like.

Continuing to block 505, at time one (indicated by T1), a first application is launched. In one or more embodiments, the first application may be a multi-user communication session application, which supports activity from the various users or devices active within the multi-user communication session. Then, at block 510 at T2, a first application state saving event occurs. As described above, an application state saving event may be a triggering combination of characteristics of an application that indicate that state information should be saved such that the current state may be returned to later on. The application state saving event may be directed by the application, such as the first application launched at 505, or may be directed by the multi-user communication session in which the application is executing. In response to the first state saving event, application state information are stored at block 515. In one or more embodiments, the application state information may indicate the characteristics of the executing application that caused the triggering event. For example, reaching a particular state of execution in the first application, a predetermined amount of time has lapsed since the application is launched and/or since the last date saving event, a user directed state saving event such as a user request, a particular state of execution of the first applications reached, and the like. The state information for the application state may include an indication of the current state of the application such that when provided to the first application, the first application may be returned to the saved state.

Moving on to block 520, at time three (indicated by T3) a second application is launched within the multi-user communication session. The second application may be a same or different type of application as the first application launch at block 505. The second application may be utilized by one or more devices in the multi-user communication session. The second application may be a multi-user communication session application such that the second application may be launched on multiple devices active in the multi-user communication session, where in the users of the multiple devices may utilize the second application together.

Next in timeline 560, at block 525, a second state saving event is detected for the first application at time for (indicated by T4). As described above, the second state saving event may be a particular configuration or event indicated by the multi-user communication session and/or the first application that indicates a current state should be saved. The second state saving event may be the same type or different type than the first saving event from block 510. At block 530, the state tracking module 170 stores the application state information for the second state saving event for the first application. In addition, state information for the first application at the second state saving event may be stored in conjunction with the application state parameters for the second state saving event.

The timeline 560 continues on to time five (indicated by T5) at block 535, where a first state saving event for the second application is detected. As described above, the application state saving event for the second application may be indicated by the second application, the multi-user communication session, a user, or the like. The state saving event for the second application may be the same as one or more state saving events for the first application, or maybe different. At block 540, the state tracking module 170 stores the application state information for the first saving event for the second application. The state information stored in conjunction with the application state information at block 540 may be data which when provided to the second application will allow the second application to return to these saved application state.

At block 545, a session state saving event is detected. A session state saving event may be based on a particular time that has elapsed since the last session state saving event, or a change in context of the multi-user communication session, such as a change in applications active in the multi-user communication session, a change in a combination of active devices or users in the multi-user communication session, a particular configuration or location has changed for the multi-user communication session, and the like. At block 550, the state tracking module 170 aggregates the current application state information. In one or more embodiments, aggregating the current application state information may include obtaining or otherwise linking to a latest saved state for each application executing in the multi-user communication session. As such, in the current example, the application state from the second state saving event for the first application and the first state saving event for the second application may be utilized to aggregate current application state information.

The timing diagram concludes at block 555, when the state tracking module 170 stores the aggregated application state information in association with the session state saving event. According to some embodiments, the session state saving event may be stored with an association to the application state information for the latest application state saving event from each application executing in the multi-user communication session. In one or more embodiments, the state tracking module 170 may additionally store other state information for the multi-user communication session, such as particular configuration of the applications, layout of an environment, and the like.

Figure 6A:
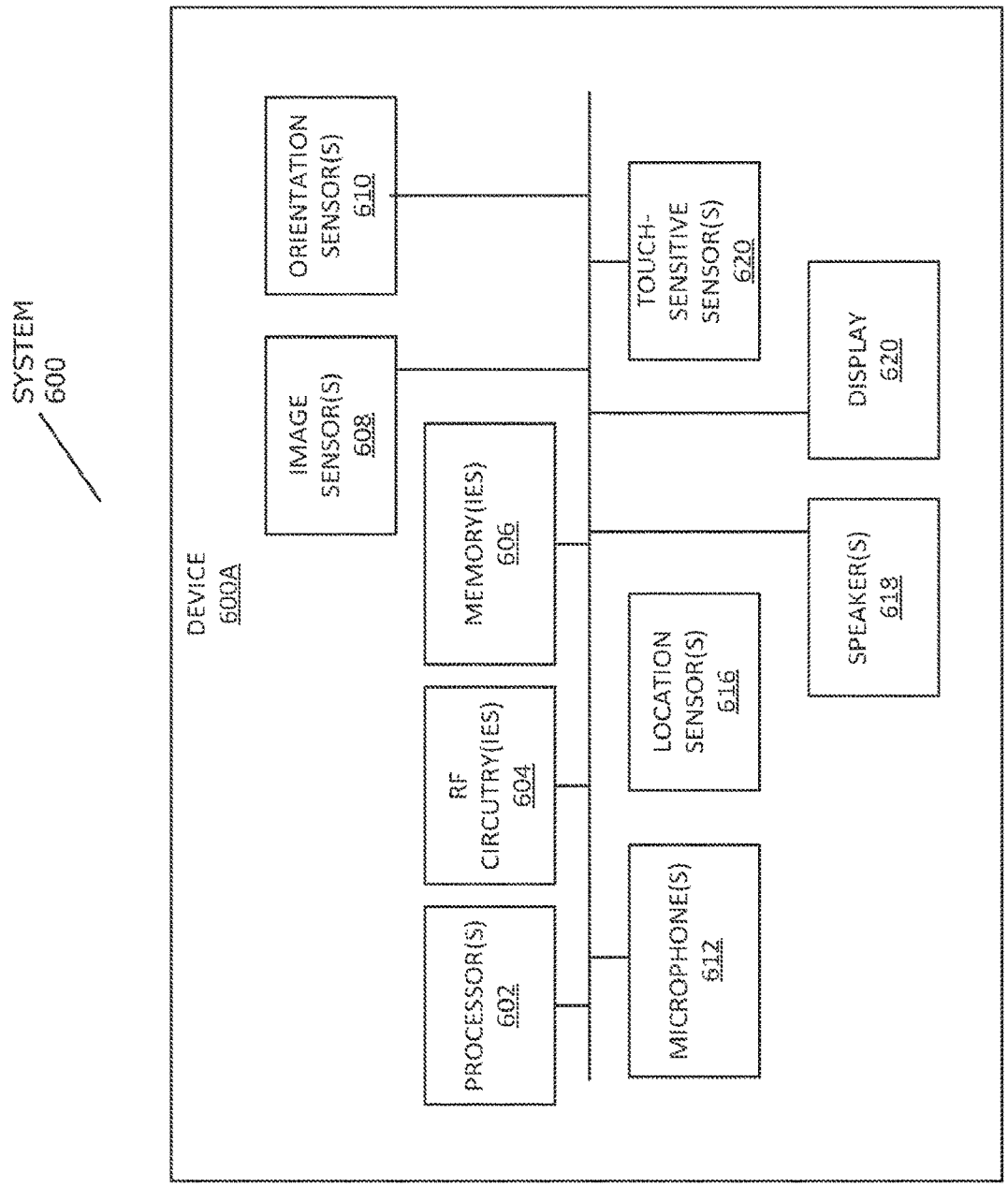
FIGS. 6A and 6B show, in block diagram form, exemplary systems for use in various extended reality technologies according to one or more embodiments.
Figure 6B:
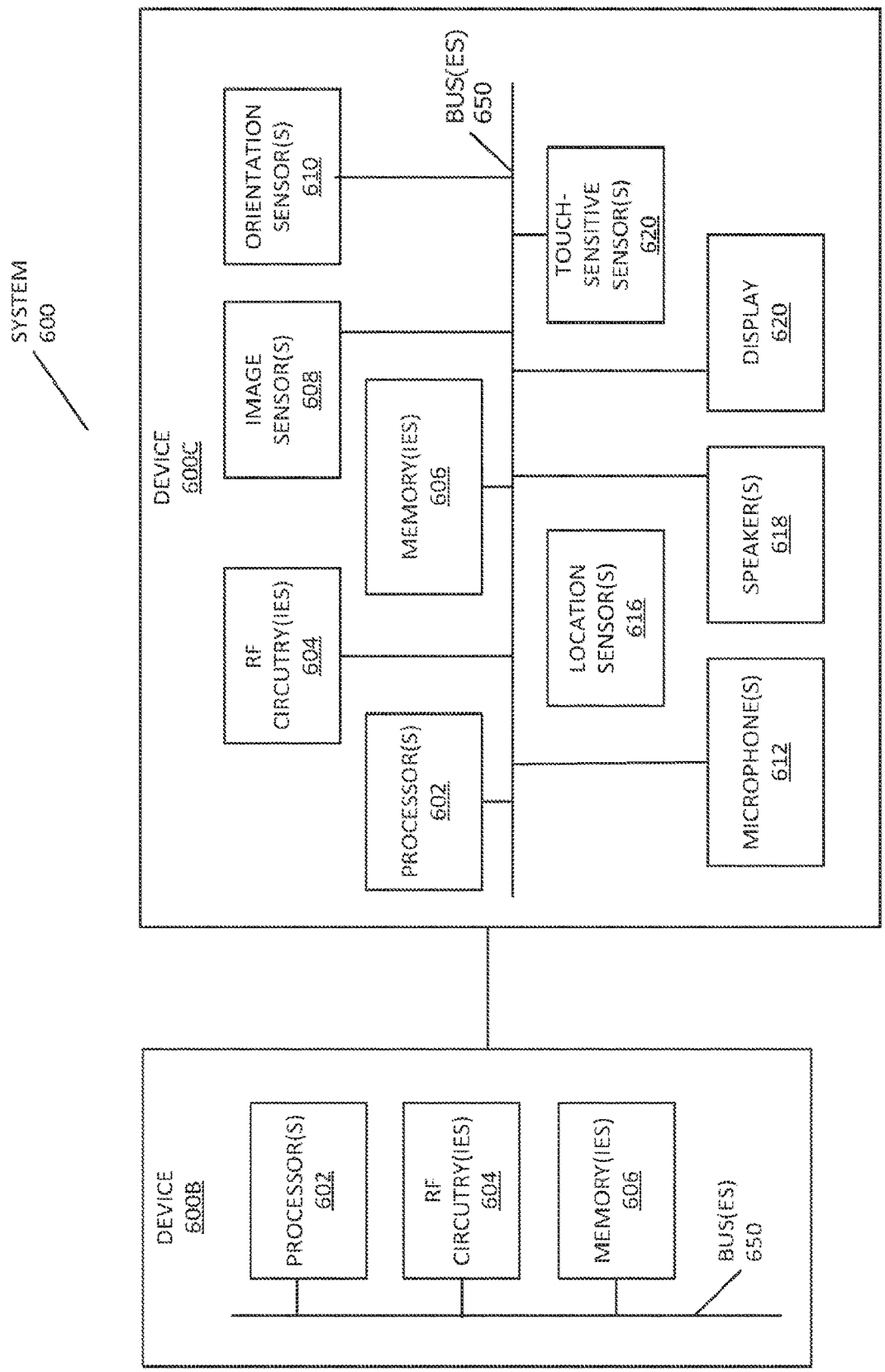

FIG. 6A and FIG. 6B depict exemplary system 600 for use in various extended reality technologies.

In some examples, as illustrated in FIG. 6A, system 600 includes device 600a. Device 600a includes various components, such as processor(s) 602, RF circuitry(ies)604, memory(ies)606, image sensor(s) 608, orientation sensor(s) 610, microphone(s)612, location sensor(s) 616, speaker(s) 618, display(s)620, and touch-sensitive surface(s) 622. These components optionally communicate over communication bus(es) 650 of device 600a.

In some examples, elements of system 600 are implemented in abase station device (e.g., a computing device, such as a remote server, mobile device, or laptop) and other elements of system 600 are implemented in a second device (e.g., a head-mounted device). In some examples, device 600a is implemented in a base station device or a second device.

As illustrated in FIG. 6B, in some examples, system 600 includes two (or more) devices in communication, such as through a wired connection or a wireless connection. First device 600b (e.g., a base station device) includes processor(s) 602. RF circuitry(ies)604, and memory(ies) 606. These components optionally communicate over communication bus(es) 650 of device 600b. Second device 600c (e.g., a head-mounted device) includes various components, such as processor(s) 602, RF circuitry(ies) 604, memory(ies) 606, image sensor(s) 608, orientation sensor(s) 610, microphone(s)612, location sensor(s) 616, speaker(s) 618, display(s)620, and touch-sensitive surface(s) 622. These components optionally communicate over communication bus(es) 650 of device 600c.

System 600 includes processor(s)602 and memory(ies) 606. Processor(s)602 include one or more general processors, one or more graphics processors, and/or one or more digital signal processors. In some examples, memory(ies) 606 are one or more non-transitory computer-readable storage mediums (e.g., flash memory, random access memory) that store computer-readable instructions configured to be executed by processor(s)602 to perform the techniques described below.

System 600 includes RF circuitry(ies) 604. RF circuitry(ies) 604 optionally include circuitry for communicating with electronic devices, networks, such as the Internet, intranets, and/or a wireless network, such as cellular networks and wireless local area networks (LANs). RF circuitry(ies) 604 optionally includes circuitry for communicating using near-field communication and/or short-range communication, such as Bluetooth®.

System 600 includes display(s) 620. Display(s)620 may have an opaque display. Display(s) 620 may have a transparent or semi-transparent display that may incorporate a substrate through which light representative of images is directed to an individual's eyes. Display(s) 620 may incorporate LEDs. OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s)620 include heads up displays, automotive windshields with the ability to display graphics, windows with the ability to display graphics, lenses with the ability to display graphics, tablets, smartphones, and desktop or laptop computers. Alternatively, system 600 may be designed to receive an external display (e.g., a smartphone). In some examples, system 600 is a projection-based system that uses retinal projection to project images onto an individual's retina or projects virtual objects into a physical setting (e.g., onto a physical surface or as a holograph).

In some examples, system 600 includes touch-sensitive surface(s) 622 for receiving user inputs, such as tap inputs and swipe inputs. In some examples, display(s) 620 and touch-sensitive surface(s)622 form touch-sensitive display(s).

System 600 includes image sensor(s) 608. Image sensors(s)608 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 608 also optionally include one or more event camera(s) configured to capture movement of physical elements in the physical setting. Image sensor(s) 608 also optionally include one or more depth sensor(s) configured to detect the distance of physical elements from system 600. In some examples, system 600 uses CCD sensors, event cameras, and depth sensors in combination to detect the physical setting around system 600. In some examples, image sensor(s) 608 include a first image sensor and a second image sensor. The first image sensor and the second image sensor are optionally configured to capture images of physical elements in the physical setting from two distinct perspectives. In some examples, system 600 uses image sensor(s) 608 to receive user inputs, such as hand gestures. In some examples, system 600 uses image sensor(s) 608 to detect the position and orientation of system 600 and/or display(s) 620 in the physical setting. For example, system 600 uses image sensor(s) 608 to track the position and orientation of display(s) 620 relative to one or more fixed elements in the physical setting.

In some examples, system 600 includes microphones(s) 612. System 600 uses microphone(s)612 to detect sound from the user and/or the physical setting of the user. In some examples, microphone(s) 612 includes an array of microphones (including a plurality of microphones) that optionally operate in tandem, such as to identify ambient noise or to locate the source of sound in space of the physical setting.

System 600 includes orientation sensor(s)610 for detecting orientation and/or movement of system 600 and/or display(s)620. For example, system 600 uses orientation sensor(s) 610 to track changes in the position and/or orientation of system 600 and/or display(s) 620, such as with respect to physical elements in the physical setting. Orientation sensor(s) 610 optionally include one or more gyroscopes and/or one or more accelerometers.

Various processes defined herein consider the option of obtaining and utilizing a user's personal information. For example, such personal information may be utilized in order to automatically determine state information in a multi-user communication session. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 2-5 or the arrangement of elements shown in FIGS. 1,2, and 6 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for facilitating collaboration in a multi-user environment, comprising:
    presenting, by a first device, a first representation of a multi-user communication session in which one or more applications are executing, and in which a first user and a second user are active, wherein the first user is active in the multi-user communication session via the first device;
    in accordance with detecting an application state saving event for one of the one or more applications:
        determining a first application state information for the one of the one or more applications; and
        storing the first application state information;
    in accordance with detecting a session state saving event:
        obtaining aggregated application state information for the one or more applications, the aggregated application state information comprising the first application state information; and
        storing the aggregated application state information in association with the session state saving event to obtain first session state information.

2. The method of claim 1, wherein storing the first application state information further comprises:
    associating the detected application state saving event with the first application state information.

3. The method of claim 1, further comprising:
    monitoring session parameters for the multi-user communication session, wherein the session parameters comprise active participants, users provided access to the session, and one or more physical environments in which each active participant is participating,
    wherein the session state saving event comprises a change in one or more of the session parameters, and
    wherein the one or more physical environments comprise one or more physical locations in which the active participants are located during the multi-user communication session.

4. The method of claim 3, further comprising, in accordance with detecting the session state saving event:
    storing the monitored session parameters in accordance with the detected change as first session parameters.

5. The method of claim 4, further comprising, in accordance with detecting initiation of a second multi-user communication session:
    in accordance with determining that current session parameters for the second multi-user communication session are compatible with the first session parameters, launching the second multi-user communication session to a first session state according to the first session state information,
    wherein the current session parameters comprise one or more of active participants in the second session, users provided access to the second session, and one or more physical environments in which each active participant is participating in the second session.

6. The method of claim 1, further comprising:
    in accordance with detecting initiation of a second multi-user communication session:
        determining a session context for the second multi-user communication session; and
        presenting a representation of the second multi-user communication session and the one or more applications according to the session context.

7. The method of claim 6, wherein the session context comprises a determined physical environment in which the device is located, and wherein the representation of the second multi-user communication session is presented in accordance with application state information corresponding to stored session parameters for the determined physical environment.

8. The method of claim 1, wherein detecting the session state saving event comprises a determination that the first device is exiting the multi-user communication session.

9. The method of claim 1, wherein the multi-user communication session comprises an extended reality environment.

10. The method of claim 1, wherein the application state saving event comprises a triggering event by which the one of the one or more applications determines to save a current application state.

11. The method of claim 1, wherein the first application state information comprises data from which the application can be returned to a particular state.

12. A non-transitory computer readable medium comprising computer readable code for facilitating collaboration in a multi-user environment, the computer readable code executable by one or more processors to:
   present, by a first device, a first representation of a multi-user communication session in which one or more applications are executing, and in which a first user and a second user are active, wherein the first user is active in the multi-user communication session via the first device;
   in accordance with detecting an application state saving event for one of the one or more applications:
      determine a first application state information for the one of the one or more applications; and
      store the first application state information;
   in accordance with detecting a session state saving event:
      obtain aggregated application state information for the one or more applications, the aggregated application state information comprising the first application state information; and
      store the aggregated application state information in association with the session state saving event to obtain first session state information.

13. The non-transitory computer readable medium of claim 12, wherein the computer readable code to store the first application state information further comprises computer readable code to:
   associate the detected application state saving event with the first application state information.

14. The non-transitory computer readable medium of claim 12, further comprising computer readable code to:
   monitor session parameters for the multi-user communication session, wherein the session parameters comprise active participants, users provided access to the session, and one or more physical environments in which each active participant is participating,
   wherein the session state saving event comprises a change in one or more of the session parameters, and
   wherein the one or more physical environments comprise one or more physical locations in which the active participants are located during the multi-user communication session.

15. The non-transitory computer readable medium of claim 14, further comprising computer readable code to, in accordance with detecting the session state saving event:
   store the monitored session parameters in accordance with the detected change as first session parameters.

16. The non-transitory computer readable medium of claim 15, further comprising computer readable code to, in accordance with detecting initiation of a second multi-user communication session:
   in accordance with determining that current session parameters for the second multi-user communication session are compatible with the first session parameters, launch the second multi-user communication session to a first session state according to the first session state information,
   wherein the current session parameters comprise one or more of active participants in the second multi-user communication session, users provided access to the second multi-user communication session, and one or more physical environments in which each active participant is participating in the second session.

17. The non-transitory computer readable medium of claim 12, further comprising computer readable code to, in accordance with detecting initiation of a second multi-user communication session:
   determine a session context for the second multi-user communication session; and
   present a representation of the second multi-user communication session and the one or more applications according to the session context.

18. The non-transitory computer readable medium of claim 17, wherein the session context comprises a determined physical environment in which the device is located, and wherein the representation of the second multi-user communication session is presented in accordance with application state information corresponding to stored session parameters for the determined physical environment.

19. The non-transitory computer readable medium of claim 12, wherein detecting the session state saving event comprises a determination that the first device is exiting the multi-user communication session.

20. A system for facilitating collaboration in a multi-user environment, comprising:
   a display;
   one or more processors;
   one or more computer readable media comprising computer readable code executable by the one or more processors to:
   present, by a first device, a first representation of a multi-user communication session in which one or more applications are executing, and in which a first user and a second user are active, wherein the first user is active in the multi-user communication session via the first device;
   in accordance with detecting an application state saving event for one of the one or more applications:
      determine a first application state information for the one of the one or more applications; and
      store the first application state information;
   in accordance with detecting a session state saving event:
      obtain aggregated application state information for the one or more applications, the aggregated application state information comprising the first application state information; and
      store the aggregated application state information in association with the session state saving event to obtain first session state information.

\* \* \* \* \*